June 12, 1956     C. B. MOORE     2,750,360
DIOLEFIN ADDITION TO HYDROCARBON RESIN FEEDS
Filed Feb. 25, 1953
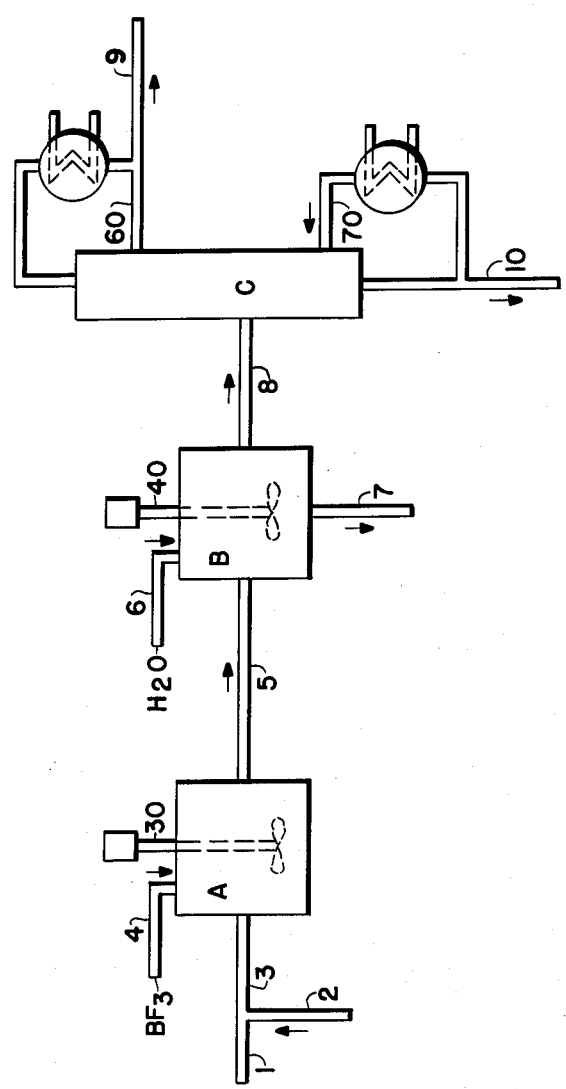
Charles B. Moore     Inventor
By    *W. H. Smyers*    Attorney

United States Patent Office 2,750,360
Patented June 12, 1956

2,750,360
DIOLEFIN ADDITION TO HYDROCARBON RESIN FEEDS

Charles B. Moore, Baton Rouge, La., assignor to Esso Research and Engineering Company, a corporation of Delaware Application February 25, 1953, Serial No. 338,685

3 Claims. (Cl. 260—82)

This invention relates to production of resins from petroleum hydrocarbon materials produced by cracking. More particularly, it relates to the addition of various cyclic diolefin hydrocarbons to certain steam-cracked distillate streams prior to the resin-forming polymerization reaction, in order to afford a better utilization of the potential resin-forming components of the streams, thereby increasing resin yield and, at the same time, giving improved quality resins.

In general, heavier petroleum fractions such as naphtha, gas oil and the like, are cracked at relatively low pressures at 1000 to 1500° F. in the presence of steam and for relatively short contact times to yield unsaturated gas and liquid streams which are separated by fractionation. This invention is concerned with improving the yield and quality of resin produced by $BF_3$ treatment of a steam-cracked distillate stream of the $C_5$–$C_7$ class, having the following characteristics:

| Boiling Range | Composition | Wt. Percent |
|---|---|---|
| 100–300° F. (38–149° C.) | Olefins | 51–72 |
|  | Diolefins | 10–15 |
|  | Paraffins | 3–4 |
|  | Aromatics | 25–30 |

It has been discovered that the addition of from 5 to 20 wt. per cent of cyclic diolefins, such as methylcyclopentadiene, prior to the $BF_3$ polymerization of the above described stream, yields an improved quality resin, possessing a higher softening point than that obtained when the $BF_3$ or other Friedel-Crafts polymerization is carried out without addition of the methylcyclopentadiene, and consequently giving a higher yield of calculated 90° C. softening point resin.

The examples (I and II) shown in the following table of data will serve to demonstrate the advantages gained from the addition of methylcyclopentadiene monomer to the distillate stream prior to the resin reaction catalyzed by $BF_3$. Example III is included to show that other diolefins, for instance, isoprene, give inferior results when added to the feed resin streams prior to $BF_3$ polymerization.

Table 1

| Reactor Feed | Example I<br>$C_5$–$C_7$ Steam-Cracked Distillate Fraction | Example II<br>Same as Example I plus 10 wt. percent Methyl-cyclopent-adiene | Example III<br>Same as Example I plus 10 wt. percent Isoprene |
|---|---|---|---|
| Catalyst (<1.0 wt. percent/feed) | $BF_3$ | $BF_3$ | $BF_3$ |
| Reaction Time, Min. | 30 | 30 | 30 |
| Reaction Temp., °F. | 30–50 | 30–50 | 30–50 |
| Resin Yield, Wt. percent on Feed [1] | 21.3 | 26.6 | 30.4 |
| Softening Point, °C. | 36.0 | 85.0 | 26.0 |
| 90° C. Softening Point Resin, Wt. percent on Feed (Calculated) | 13.0 | 25.4 | 19.2 |

[1] Resin yield obtained when reaction product stripped to a bottoms temperature of 500° F. at 0 to 2 mm. pressure.

It will be noted in Example II that the addition of 10 wt. per cent of methylcyclopentadiene to the distillate stream increased the resin softening point from 36° C. to 85° C. When expressing resin yield on a 90° C. softening point basis, it can be seen that resin yield was increased from 13.0 to 25.4 wt. per cent. Thus, addition of the cyclic diolefin material effected a significant improvement in the resin quality and yield.

Example III is included to show that the addition of an acyclic diolefin, isoprene, to the distillate stream does not yield the favorable results obtained by adding the cyclic diolefin. Resin softening point is decreased from 36° C. to 26° C.

This invention can be better understood by following the process description outlined below and referring to the attached flow plan.

Stream 1 contains $C_5$, $C_6$, and $C_7$ hydrocarbons, has a boiling range of 100–300° F. and has about 10–15 wt. per cent diolefins, 51–62 wt per cent olefins, 25–30 wt. per cent aromatics and 3–4 wt. per cent paraffins. Stream 2 consists of methylcyclopentadiene monomer in the amount of 5 to 20 wt. per cent of stream 1. Stream 3, a mixture of streams 1 and 2, is fed to a reactor A. Refrigeration is provided to maintain the contents of the reactor vessel at a temperature within the range of —40 to +50° F. A polymerization catalyst, $BF_3$, is added as a gas in the amount of 0.1 to 1.0 wt. per cent based on the amount of liquid feed to the vessel. The liquid undergoing reaction is well agitated by means of agitator 30 to insure adequate saturation of the liquid with the gas. The reaction vessel is sized to allow a reaction time of 10–30 minutes. Stream 5 containing resin and $BF_3$ catalyst in solution in unreacted hydrocarbon is passed to vessel B where the $BF_3$ is removed by contacting with a water stream 6 at a temperature of 50–150° F. and a pressure of 0–200 p. s. i. g. Any suitable material may be used in lieu of water to remove the $BF_3$ from the hydrocarbon solution. Stream 7 consisting of $BF_3$ dissolved in water is withdrawn from the bottom of the vessel. Agitator 40 provides for adequate contact between water and hydrocarbon to obtain the necessary removal of $BF_3$ by the water. Stream 8, consisting of resin dissolved in unreacted hydrocarbon and essentially free of $BF_3$ catalyst, is fed to the second plate of a 40 plate fractionating tower C. From this tower unreacted hydrocarbon passes overhead and is condensed. A portion of the stream is returned to the tower as reflux through line 60 and the remainder is withdrawn as stream 9. Resin product is withdrawn as bottoms stream 10 from the tower. A portion is recycled to the bottom of the tower through a reboiler and line 70 to provide necessary heat for the fractionation.

What is claimed is:

1. An improved process for preparing hydrocarbon petroleum resins which comprises the steps of admixing a steam cracked petroleum stream boiling from 100° to 300° F., and containing from 51 to 62 wt. per cent olefins, from 10 to 15 wt. per cent diolefins, from 3 to 4 wt. per cent paraffins, and from 25 to 30 wt. per cent aromatics with from 5 to 20 wt. per cent of methylcyclopentadiene, polymerizing the resulting unsaturated mixture with $BF_3$ at a temperature of from —40 to +50° F., and isolating the resin produced thereby.

2. An improved process for preparing hydrocarbon petroleum resins which comprises polymerizing a steam cracked petroleum stream boiling from 100° to 300° F., and containing from 51 to 62 wt. per cent olefins, from 10 to 15 wt. per cent diolefins, from 3 to 4 wt. per cent paraffins, and from 25 to 30 wt. per cent aromatics in the presence of from 5 to 20 wt. per cent of methylcyclopentadiene with $BF_3$ at a temperature of from —40 to +50° F.

3. An improved process for preparing hydrocarbon petroleum resins which comprises the steps of admixing a steam cracked petroleum stream boiling from 100° to 300° F., and containing from 51 to 62 wt. per cent olefins, from 10 to 15 wt. per cent diolefins, from 3 to 4 wt. per cent paraffins, and from 25 to 30 wt. per cent aromatics with about 10 wt. per cent methylcyclopentadiene, polymerizing the resulting mixture with $BF_3$ at a temperature of from $+30°$ to $+50°$ F., and isolating the resin produced thereby.

References Cited in the file of this patent

UNITED STATES PATENTS

| | | |
|---|---|---|
| 1,263,813 | Sperr | Apr. 23, 1918 |
| 2,193,792 | Wilson | Mar. 19, 1940 |
| 2,211,038 | Ward | Aug. 13, 1940 |
| 2,521,359 | Garber | Sept. 5, 1950 |